United States Patent
Zhang et al.

(10) Patent No.: US 9,489,192 B2
(45) Date of Patent: Nov. 8, 2016

(54) DEVICE AND METHOD FOR UPGRADING DATA TERMINAL

(71) Applicant: ZTE Corporation, Shenzhen (CN)

(72) Inventors: Yabing Zhang, Shenzhen (CN); Xiaoyu Sun, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/774,854

(22) PCT Filed: Aug. 2, 2013

(86) PCT No.: PCT/CN2013/080737
§ 371 (c)(1),
(2) Date: Sep. 11, 2015

(87) PCT Pub. No.: WO2013/178194
PCT Pub. Date: Dec. 5, 2013

(65) Prior Publication Data
US 2016/0026460 A1    Jan. 28, 2016

(30) Foreign Application Priority Data

Mar. 11, 2013 (CN) .......................... 2013 1 0076772

(51) Int. Cl.
*G06F 9/445* (2006.01)
*H04L 29/08* (2006.01)
*H04L 29/12* (2006.01)

(52) U.S. Cl.
CPC ........... *G06F 8/665* (2013.01); *H04L 61/2015* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 7,007,077 B1 | 2/2006 | Shinohara | |
| 8,149,844 B1 * | 4/2012 | Roskind | G06F 8/65 370/241 |

(Continued)

FOREIGN PATENT DOCUMENTS

| | | | |
|---|---|---|---|
| CN | 101159957 A | 4/2008 | |
| CN | 101646263 A | 2/2010 | |

(Continued)

OTHER PUBLICATIONS

International Search Report for corresponding application PCT/CN2013/080737 filed Aug. 2, 2013; Mail date Dec. 19, 2013.

(Continued)

*Primary Examiner* — Chuck Kendall
(74) *Attorney, Agent, or Firm* — Cantor Colburn LLP

(57) ABSTRACT

Provided are a device and method for upgrading a data terminal. The device includes a dialing component, a protocol component, a DHCP Dynamic Host Configuration Protocol (DHCP) server component, a router component, an Internet Protocol (IP) processing component, an upgrading component and a web server component, wherein the dialling component implements a dialling flow; and the upgrading component acquires a private IP address from the DHCP server component, sends a request message of detecting whether there is a new version to a version server through the router component and the protocol component, and if there is the new version, downloads the new version from the version server and writes the new version into a flash of a data terminal, and then the data terminal is automatically restarted to finish upgrading. According to the technical solution, an upgrading process of the data terminal under a win8 operating system, a web server access process and a network access process of a Personal Computer (PC) are independently implemented, relevance between the upgrading process of the data terminal and an operating system of the PC is reduced, Microsoft win8 logo authentication can be passed, and a driver-free function may further be realized.

20 Claims, 5 Drawing Sheets

(56) References Cited

U.S. PATENT DOCUMENTS

2010/0278070 A1    11/2010   Melia
2012/0060151 A1    3/2012   Oh

FOREIGN PATENT DOCUMENTS

| | | |
|---|---|---|
| CN | 101765237 A | 6/2010 |
| CN | 102231878 A | 11/2011 |
| CN | 102236571 A | 11/2011 |
| CN | 102378154 A | 3/2012 |
| CN | 103220330 A | 7/2013 |
| EP | 2378416 A1 | 10/2011 |

OTHER PUBLICATIONS

European Search Report for corresponding application EP 13 79 7192; Mail date Mar. 22, 2016.

* cited by examiner

DEVICE AND METHOD FOR UPGRADING DATA TERMINAL

TECHNICAL FIELD

The present disclosure relates to the field of communication technologies, and in particular to a device and method for upgrading a data terminal under, e.g., a Windows 8 (win8) operating system.

BACKGROUND

At present, when a data terminal (such as a data card, a driver-free data card, a mobile hotspot, a mobile hotspot with a Universal Serial Bus (USB) tether function and the like) is used under an operating system except win8, the data terminal usually adopts the following upgrading manner when working in a router mode: the data terminal reports a Remote Network Driver Interface Specification (RNDIS) interface or a Network Driver Interface Specification (NDIS) interface, and an Over-The-Air (OTA) upgrading manner or other upgrading manners are adopted. The OTA upgrading manner refers to detecting whether there is a new version on a version server or not after the data terminal is started, downloading the new version into a flash of the data terminal and restarting the data terminal to finish upgrading.

However, in a win8 operating system, when the data terminal works in a modem mode, the data terminal reports a Mobile Broadband Interface Model (MBIM) interface, and during upgrading, a user usually adopts an interface provided by Microsoft for upgrading or performs upgrading after downloading an upgrading version into a Personal Computer (PC), which increases a burden to the system, and lowers running efficiency of the system.

SUMMARY

The embodiments of the present disclosure provide a device and method for upgrading a data terminal, so as to solve the problem of dependence on a Microsoft upgrading interface or a PC during upgrading of a data terminal to a new version under a win8 operating system and improve running efficiency of the system.

The embodiment of the present disclosure proposes a device for upgrading a data terminal, including: a router component, and a protocol component, a Dynamic Host Configuration Protocol (DHCP) server component and an upgrading component, which are all coupled with the router component, further including: a dialling component coupled with the protocol component, wherein the dialling component is configured to initiate and implement a network dialling flow of a data terminal; the upgrading component is configured to negotiate and implement a DHCP procedure with the DHCP server component; the DHCP server component is configured to allocate a private Internet Protocol (IP) address to the upgrading component; the upgrading component is configured to send, through the router component and the protocol component, a request message of detecting whether there is a new version or not to a version server on a network side after the DHCP server successfully allocates the private IP address to the upgrading component, and when there is the new version on the version server, download the new version from the version server and write the new version into a flash of the data terminal, which enables the data terminal to finish upgrading upon automatic restart.

In an example embodiment, the device further includes: an IP processing component, wherein the IP processing component is coupled with a PC; and the IP processing component is configured to acquire, through the router component, an IP address of the PC from the DHCP server component, allocate the acquired IP address to the PC, and perform user service processing between the PC and the network side through the router component and the protocol component.

In an example embodiment, the IP processing component is further configured to send a DHCP discover message to the DHCP server component through the router component; the DHCP server component is further configured to process the DHCP discover message, and return a DHCP offer message to the IP processing component through the router component;

the IP processing component is further configured to process the received DHCP offer message, and return a DHCP request message to the DHCP server component through the router component;

the DHCP server component is further configured to process the DHCP request message, and return a DHCP Acknowledgement (ACK) message to the IP processing component through the router component, wherein the DHCP ACK message contains a private IP address allocated to the PC; and the IP processing component is configured to, when a user dials, allocate, through an Object Identifier (OID) message, to the PC the private IP address allocated by the DHCP server component.

In an example embodiment, when the data terminal is required to pass win8 logo authentication, the IP processing component is further configured to implement MBIM related processing with the PC through an MBIM protocol.

In an example embodiment, the IP processing component is further configured to receive and process a network access request message sent by the PC; send the network access request message to the network side through the router component and the protocol component; receive a response message returned by the network side through the router component and the protocol component; and process the response message and send the response message to the PC.

In an example embodiment, the device further includes: a web server component, wherein the web server component is configured to perform web service control for the PC through the router component and the IP processing component.

In an example embodiment, the IP processing component is further configured to receive and process a web server access request message sent by the PC, and send the web server access request message to the web server component through the router component;

the web server component is further configured to return a response message to the IP processing component through the router component; and the IP processing component is further configured to process the response message, and send the response message to the PC.

The embodiment of the present disclosure further proposes a method for upgrading a data terminal, which includes that:

a dialling component initiates and implements a network dialling flow of a data terminal; an upgrading component negotiates and implements a DHCP procedure with a DHCP server component, and the DHCP server component allocates a private IP address to the upgrading component;

after the DHCP server component successfully allocates the private IP address to the upgrading component, the upgrading component sends a request message of detecting whether there is a new version or not to a version server on a network side through a router component and a protocol component; and when there is the new version on the version server, the upgrading component downloads the new version from the version server, and writes the new version into a flash of the data terminal, which enables the data terminal to finish upgrading upon automatic restart.

In an example embodiment, the method further includes that:

an IP processing component acquires an IP address of a PC from the DHCP server component through the router component, and allocates the acquired IP address to the PC; and the IP processing component performs user service processing between the PC and the network side through the router component and the protocol component.

In an example embodiment, the step that the IP processing component acquires the IP address of the PC from the DHCP server component through the router component, and allocates the acquired IP address to the PC includes that:

the IP processing component sends a DHCP discover message to the router component, through which the DHCP discover message is sent to the DHCP server component;

the DHCP server component processes the DHCP discover message, and returns a DHCP offer message to the IP processing component through the router component;

the IP processing component processes the received DHCP offer message, and returns a DHCP request message to the DHCP server component through the router component;

the DHCP server component processes the DHCP request message, and returns a DHCP ACK message to the IP processing component through the router component, wherein the DHCP ACK message contains a private IP address allocated to the PC; and when a user dials, the IP processing component allocates, to the PC through an OID message, the private IP address allocated by the DHCP server component.

In an example embodiment, after the step that the IP processing component allocates, to the PC through the OID message, the private IP address allocated by the DHCP server component, the method further includes that:

when the data terminal is required to pass win8 logo authentication, the IP processing component implements MBIM related processing with the PC through an MBIM protocol.

In an example embodiment, the step that the IP processing component performs user service processing between the PC and the network side through the router component and the protocol component includes that:

the IP processing component receives and processes a network access request message sent by the PC, and sends the network access request message to the network side through the router component and the protocol component; and the IP processing component receives a response message returned by the network side through the router component and the protocol component, processes the response message and sends the response message to the PC.

In an example embodiment, the method further includes that:

a web server component performs web service control for the PC through the router component and the IP processing component.

In an example embodiment, the step that the web server component performs the web service control for the PC through the router component and the IP processing component includes that:

the IP processing component receives and processes a web server access request message sent by the PC, and sends the web server access request message to the web server component through the router component;

the web server component returns a response message to the IP processing component through the router component; and the IP processing component processes the response message, and sends the response message to the PC.

According to the device and method for upgrading a data terminal provided by the embodiments of the present disclosure, by virtue of the cooperation of the upgrading component, the router component, the protocol component, the DHCP server component, the IP processing component and the web server component, a data terminal upgrading process, a web server access process and a network access process of the PC are able to be independently implemented, so that relevance between the data terminal upgrading process and an operating system of the PC is reduced. By virtue of the technical solution, when being used under the win8 operating system, the data terminal starts a router mode and reports an MBIM interface, then not only Microsoft win8 logo authentication can be passed, but also a driver-free function may be realized, and dependence on the operating system during the upgrading of the data terminal may further be eliminated, so that the burden to the system is lowered, and the running efficiency of the system is improved.

DETAILED DESCRIPTION OF THE EMBODIMENTS

A main thought of the technical solution of the embodiments of the present disclosure is as follows: by virtue of the cooperation of an upgrading component, a router component, a protocol component, a DHCP server component, an IP processing component, and a web server component, a data terminal upgrading flow, user network access, service processing and parameter configuration flows and the like are able to be independently implemented; a data terminal is enabled to start a router mode and report an MBIM interface when being used under a win8 operating system, then not only the Microsoft win8 logo authentication can be passed, but also a driver-free function may be realized; in addition, dependence on the operating system during the upgrading of the data terminal may further be eliminated, so that a burden to the system is lowered, and running efficiency of the system is improved.

According to the solution of an embodiment of the present disclosure, the data terminal includes, but is not limited to the following products: a data card, a driver-free data card, a mobile hotspot or a mobile hotspot with a USB tether function, and the solution of the current embodiment of the present disclosure describes a method for upgrading the data terminal under the win8 operating system by taking the driver-free data card as an example. As mentioned before, the driver-free data card in the related art works in the router mode and reports an RNDIS interface or an NDIS interface when being used under an operating system except win8, and an OTA upgrading manner or other upgrading manners may be adopted. However, in the win8 operating system, the data terminal works in a modem mode and reports an MBIM interface; and during upgrading, a user usually adopts an interface provided by the Microsoft for upgrading or performs upgrading after downloading an upgrading version into a PC. By the solution of the embodiment of the present disclosure, the problem of requirement on use of the Microsoft interface or downloading of the version into the PC for upgrading during the upgrading of the data terminal under the win8 operating system can be solved.

Figure 1:
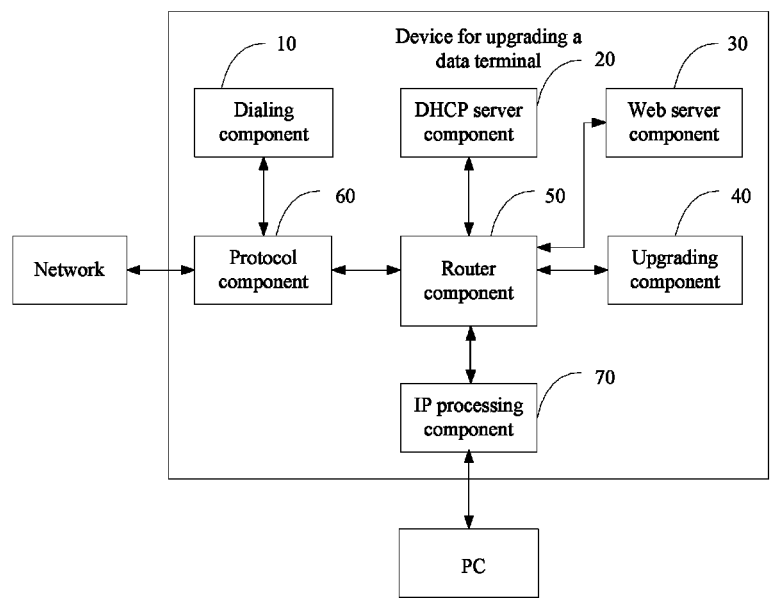
FIG. 1 is a structure diagram of an embodiment of a device for upgrading a data terminal according to the present disclosure.

Specifically, as shown in FIG. 1, an embodiment of the present disclosure provides a device for upgrading a data terminal, which includes: a dialling component, a protocol component, a DHCP server component, a router component, an IP processing component, an upgrading component and a web server component, wherein the protocol component, the DHCP server component, the upgrading component and the IP processing component are all coupled with the router component, the dialling component is coupled with the protocol component, the protocol component is further coupled with a network side, and the IP processing component is further coupled with a PC.

Figure 2:
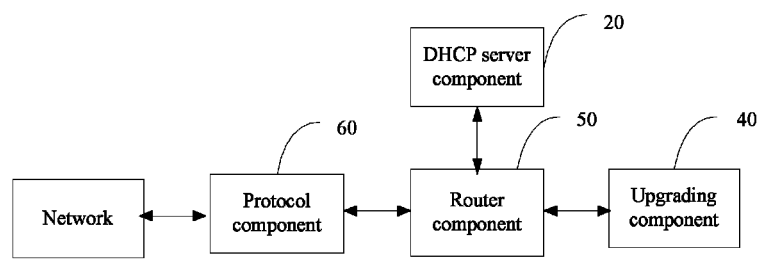
FIG. 2 is a structure diagram of upgrading a data terminal under a win8 operating system according to an embodiment of the device for upgrading a data terminal of the present disclosure.
Figure 3:
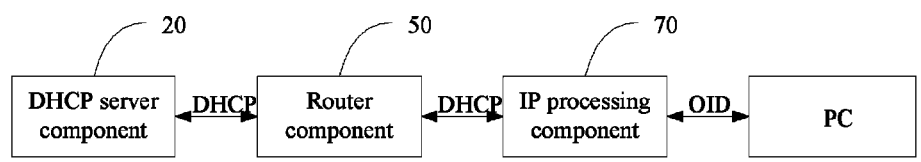
FIG. 3 is a structure diagram of acquiring an IP address of a PC under a win8 operating system according to an embodiment of the device for upgrading a data terminal of the present disclosure.
Figure 4:
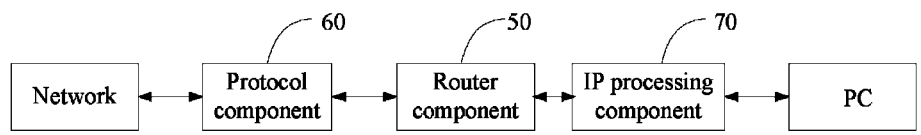
FIG. 4 is a structure diagram of a user service processing flow under a win8 operating system according to an embodiment of the device for upgrading a data terminal of the present disclosure.
Figure 5:
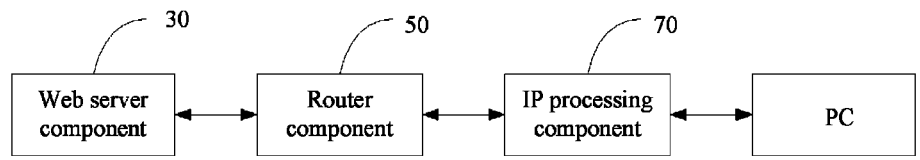
FIG. 5 is a structure diagram of implementing web page access and operation under a win8 operating system according to an embodiment of the device for upgrading a data terminal of the present disclosure.

The protocol component is mainly responsible for communicating with the network side. The dialling component is mainly responsible for initiating a network dialling flow of a data terminal and implementing dialling. The DHCP server component is responsible for allocating small network IP addresses to the IP processing component, the upgrading component and the web server component. The router component is responsible for receiving messages or data from the protocol component, the DHCP server component, the IP processing component, the upgrading component and the web server component, and forwarding the messages or the data to proper components. The IP processing component is responsible for applying for an IP address to the DHCP server component, allocating the IP address to a PC through an OID message, and processing an MBIM protocol to implement Microsoft win8 logo authentication. The upgrading component is responsible for detecting and upgrading a new version. The web server component is mainly responsible for providing services for a web User Interface (UI). The DHCP server component, the router component, the IP processing component and the PC cooperate to implement PC IP address allocation and Microsoft win8 logo authentication (as shown in FIG. 3). A network, the protocol component, the router component and the upgrading component cooperate to implement version detection and version upgrading (as shown in FIG. 2). The web server component, the router component, the IP processing component and the PC cooperate to implement web page access and operation (as shown in FIG. 5). The network, the protocol component, the router component, the IP processing component and the PC cooperate to realize a user network access function (as shown in FIG. 4).

More specifically, in the embodiment, the protocol component is responsible for processing various protocols, receiving a message or data received by an upper layer, processing the message or the data according to a format specified by a protocol, and sending the processed message and data to a network side; and receiving a message or data from the network side, and processing and sending the received message and data to the upper layer.

The dialling component is responsible for initiating the network dialling flow and implementing dialling.

The DHCP server component is responsible for allocating the small network IP addresses to the IP processing component, the upgrading component and the web server component.

The router component is responsible for receiving the messages or data from the protocol component, the DHCP server component, the IP processing component, the upgrading component and the web server component, and forwarding the received messages or data to proper components according to the IP addresses or port numbers. The router component further includes a Network Address Translation (NAT) processing element, the NAT processing element converts a network address and port into a private address and port after the router component receives the data from the network side, and when data of the data terminal is sent to the network side, the NAT processing element converts the private address and port number into the network address and port number.

The IP processing component is responsible for applying for the IP address to the DHCP server component, and allocating the acquired IP address to the PC through the OID message. The IP processing component further includes an MBIM protocol processing element, and the MBIM protocol processing element is responsible for implementing Microsoft win8 logo authentication.

The upgrading component sends a version detection message to detect whether a version server has a new version or not after the data terminal is successfully initialized and connected, downloads the new version to a flash when finding a new version in the version server, and triggers the data terminal to restart to finish upgrading.

Each processing flow of the embodiment is described below in detail.

As shown in FIG. 2, a terminal data upgrading flow under the win8 operating system in the embodiment is specifically described as follows.

Step 1: the data terminal is initialized and successfully dials; the upgrading component and the DHCP server component negotiate and implement a DHCP procedure, and the DHCP server component successfully allocates a private IP address to the upgrading component.

Step 2: the upgrading component sends a request message of detecting whether there is a new version or not on the version server, wherein the message is sent to the network side through the router component and the protocol component.

Step 3: the version server sends a response message indicating whether there is the new version on the version server or not to the upgrading component to notify the upgrading component whether there is the new version in the version server or not, wherein the message is sent to the upgrading component through the protocol component and the router component.

Step 4: if there is no new version on the version server, the flow is ended; if there is a new version on the version server, a user is notified, through a redirect message, that there is the new version on the version server when accessing the network, and is prompted to select whether to perform upgrading or not; if the user selects NO, the flow is ended; and if the user selects YES, the upgrading component downloads the version from the version server, and writes the version into the flash.

Step 5: after the version is downloaded, the data terminal is automatically restarted to finish upgrading.

From the above process, the data terminal is upgraded under the win8 operating system in the embodiment, and dependence on the operating system as well as Microsoft authentication is eliminated, so that the burden of the system may be reduced, and the efficiency of the system may be improved.

As shown in FIG. 3 and FIG. 4, a processing flow that the data terminal in the embodiment implements PC IP address allocation and Microsoft win8 logo authentication (as shown in FIG. 3) through the cooperation of the DHCP server component, the router component, the IP processing component and the PC and a processing flow that the data terminal in the embodiment realizes the user network access function (as shown in FIG. 4) through the cooperation of the network, the protocol component, the router component, the IP processing component and the PC are described as follows.

Step 1: the IP processing component sends a DHCP discover message to the router component; and the router component sends the DHCP discover message to the DHCP server component.

Step 2: the DHCP server component processes the DHCP discover message, and returns a DHCP offer message to the router component; and the router component routes the message to the IP processing component.

Step 3: the IP processing component processes the received DHCP offer message, and returns a DHCP request message to router component; and the router component routes the message to the DHCP server component.

Step 4: the DHCP server component processes the DHCP request message, and returns a DHCP ACK message to the router component; and the router component routes the DHCP ACK message to the IP processing component. In this way, the IP processing component acquires the small network IP address allocated by the DHCP server component.

Step 5: when the user dials, the IP processing component allocates, to the PC through an OID message, the private IP address allocated by the DHCP server component. In this way, the PC acquires the small network IP address.

Step 6: if the data terminal is required to pass win8 logo authentication, the PC communicates with the MBIM protocol processing element to implement MBIM related processing. If the data terminal is not required to pass win8 logo authentication, Step 6 may be omitted.

Step 7: the PC sends a network access request message to the IP processing component according to the acquired private IP address.

Step 8: the IP processing component processes the network access request message, and sends the network access request message to the router component.

Step 9: the router component routes the network access request message to the protocol component.

Step 10: the protocol component sends the network access request message to the network side, and receives a response message returned by the network side.

Step 11: the protocol component sends the response message to the router component.

Step 12: the router component routes the response message to the IP processing component.

Step 13: the IP processing component processes the response message and sends the response message to the PC.

As shown in FIG. 5, a flow of implementing web page access and operation through cooperation of the web server component, the router component, the IP processing component and the PC in the embodiment is specifically described as follows.

Step 1: the PC sends a web server access request message.

Step 2: the IP processing component processes the web server access request message, and sends the web server access request message to the router component.

Step 3: the router component routes the web server access request message to the web server component.

Step 4: the web server component returns a response message to the router component.

Step 5: the router component routes the response message to the IP processing component.

Step 6: the IP processing component processes the response message, and sends the response message to the PC.

According to the solution of the embodiment, the small network IP addresses are adopted to enable the upgrading component, the web server component and the PC to independently implement the upgrading process, the web server access process and the network access process of the PC, so as to reduce relevance between the upgrading process and the operating system of the PC. According to the solution, the IP processing component is added between the PC and the router component, and is mainly intended to enable the data terminal to support the MBIM protocol, allocate the IP address to the PC through the OID message, and support win8 logo authentication. In such a manner, not only the Microsoft win8 logo authentication can be passed, but also the driver-free function may be realized, and in addition, the dependence of data terminal upgrading on the operating system may further be eliminated, so that the burden of the system is reduced, and the running efficiency of the system is improved.

The device of the embodiment may be arranged in the data terminal, and may also be independent of the data terminal.

Figure 6:
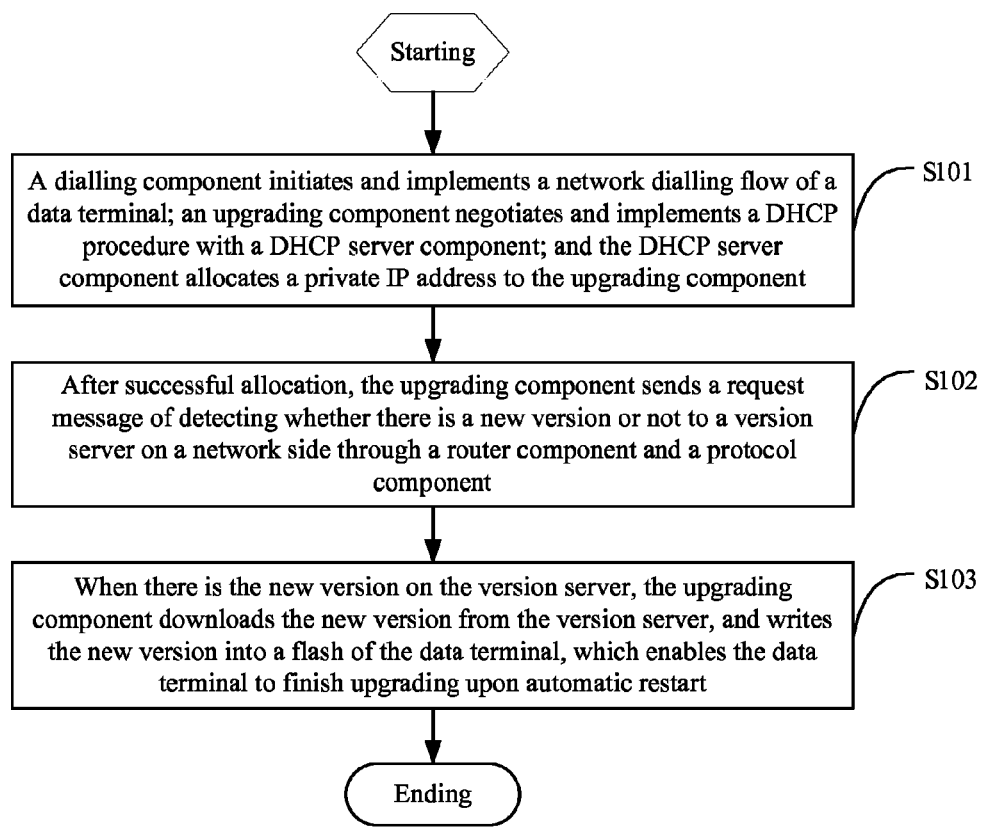
FIG. 6 is a flowchart of an embodiment of a method for upgrading a data terminal according to the present disclosure.

As shown in FIG. 6, an embodiment of the present disclosure provides a method for upgrading a data terminal, which is implemented on the basis of the device according to the abovementioned embodiments. The method includes:

Step 101: a dialling component initiates and implements a network dialling flow of a data terminal; an upgrading component negotiates and implements a DHCP procedure with a DHCP server component, and the DHCP server component allocates a private IP address to the upgrading component;

Step 102: after the DHCP server component successfully allocates the private IP address to the upgrading component, the upgrading component sends a request message of detecting whether there is a new version or not to a version server on a network side through a router component and a protocol component; and Step 103: when there is the new version on the version server, the upgrading component downloads the new version from the version server, and writes the new version into a flash of the data terminal, which enables the data terminal to finish upgrading upon automatic restart.

If there is the new version on the version server, a user is notified, when accessing a network, that there is a new version on the version server through a redirect message, and is prompted to select whether to perform upgrading or not. If the user selects NO, the flow is ended. If the user selects YES, the upgrading component downloads the version from the version server, and writes the version into the flash. After the version is downloaded, the data terminal is automatically restarted to finish upgrading. If there is no new version on the version server, the flow is ended.

According to the solution of the embodiment, when the data terminal is upgraded under the win8 operating system in the embodiment, dependence on the operating system as well as Microsoft authentication is eliminated, so that the burden of the system may be reduced, and the efficiency of the system may be improved.

Figure 7:
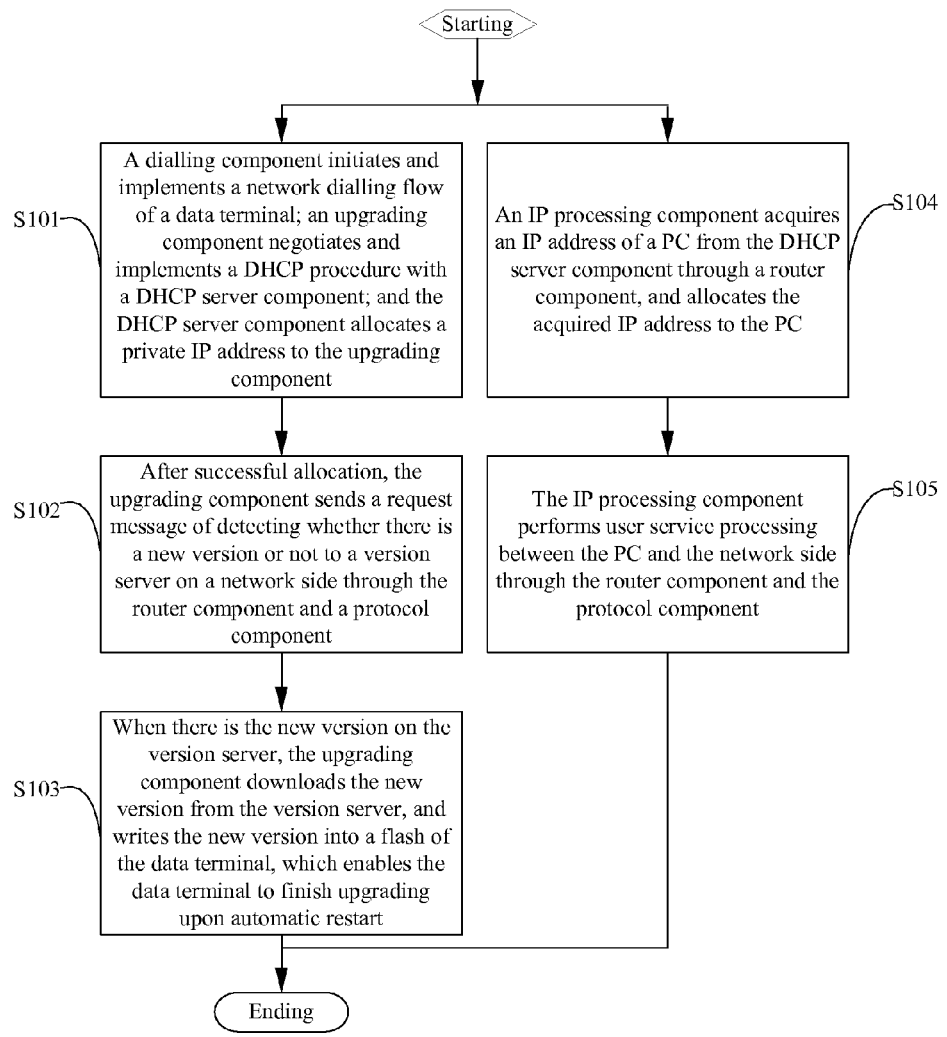
FIG. 7 is a flowchart of another embodiment of a method for upgrading a data terminal according to the present disclosure.

As shown in FIG. 7, another embodiment of the present disclosure provides a method for upgrading a data terminal. On the basis of the abovementioned embodiment, the method may further include:

Step 104: an IP processing component acquires an IP address of a PC from the DHCP server component through the router component, and allocates the acquired IP address to the PC.

A specific process is as follows:

the IP processing component sends a DHCP discover message to the router component, through which the DHCP discover message is sent to the DHCP server component;

the DHCP server component processes the DHCP discover message, and returns a DHCP offer message to the IP processing component through the router component;

the IP processing component processes the received DHCP offer message, and returns a DHCP request message to the DHCP server component through the router component;

the DHCP server component processes the DHCP request message, and returns a DHCP ACK message to the IP processing component through the router component, wherein the DHCP ACK message contains a private IP address allocated to the PC; and when the user dials, the IP processing component allocates, to the PC through an OID message, the private IP address allocated by the DHCP server component.

In an example embodiment, when the data terminal is required to pass win8 logo authentication, the IP processing component implements MBIM related processing with the PC through an MBIM protocol.

Step 105: the IP processing component performs user service processing between the PC and the network side through the router component and the protocol component.

A specific process is as follows: the IP processing component receives and processes a network access request message sent by the PC, and sends the network access request message to the network side through the router component and the protocol component; and the IP processing component receives a response message returned by the network side through the router component and the protocol component, processes the response message and sends the response message to the PC.

According to the solution of the embodiment, PC IP address allocation, Microsoft win8 logo authentication and user network access functions are realized.

Figure 8:
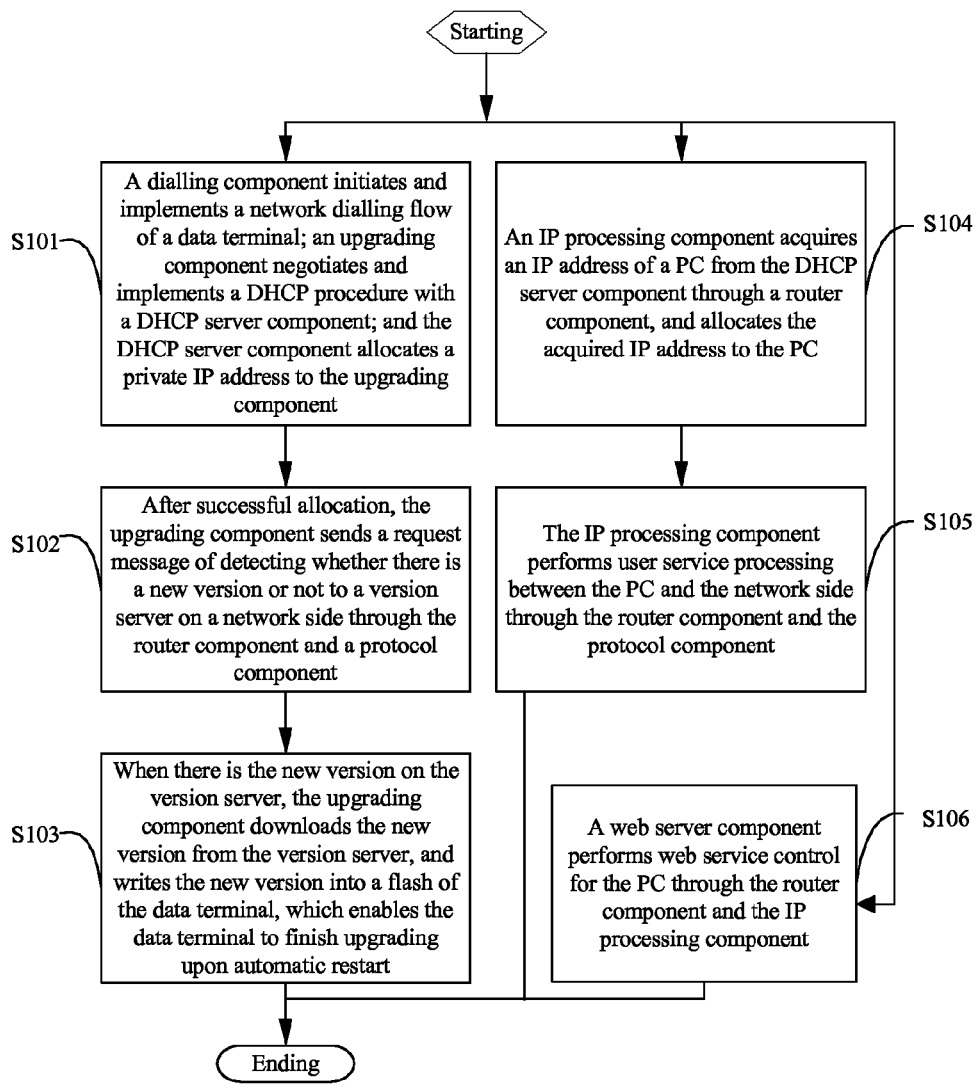
FIG. 8 is a flowchart of a third embodiment of a method for upgrading a data terminal according to the present disclosure.

As shown in FIG. 8, a third embodiment of the present disclosure provides a method for upgrading a data terminal. On the basis of the embodiment shown in FIG. 7, the method further includes:

Step 106: a web server component performs web service control for the PC through the router component and the IP processing component.

A specific process is as follows:

the IP processing component receives and processes a web server access request message sent by the PC, and sends the web server access request message to the web server component through the router component;

the web server component returns a response message to the IP processing component through the router component; and the IP processing component processes the response message, and sends the response message to the PC.

According to the device and method for upgrading a data terminal of the embodiments of the present disclosure, by virtue of the cooperation of the upgrading component, the router component, the protocol component, the DHCP server component, the IP processing component and the web server component, the data terminal upgrading process, the web server access process and the network access process of the PC are able to be independently implemented, so that relevance between the data terminal upgrading process and an operating system of the PC is reduced. When being used under the win8 operating system, the data terminal starts the router mode and reports the MBIM interface, in this way, not only the Microsoft win8 logo authentication can be passed, but also the driver-free function may be realized; in addition, and dependence on the operating system during the upgrading of the data terminal may further be eliminated, so that the burden of the system is lowered, and the running efficiency of the system is improved.

The above is only the example embodiment of the present disclosure and not intended to limit the scope of the present disclosure. Equivalent structure or flow transformations made by virtue of contents of the Specification and drawings of the present disclosure or direct or indirect application of the contents of the Specification and drawings of the present disclosure to the other related technical fields shall fall within the scope of protection defined by the claims of the present disclosure.

What is claimed is:

1. A device for upgrading a data terminal, comprising: a router component, and a protocol component, a Dynamic Host Configuration Protocol (DHCP) server component and an upgrading component, which are all coupled with the router component, further comprising a dialling component coupled with the protocol component, wherein the dialling component is configured to initiate and implement a network dialling flow of a data terminal; the upgrading component is configured to negotiate and implement a DHCP procedure with the DHCP server component; the DHCP server component is configured to allocate a private Internet Protocol (IP) address to the upgrading component; the upgrading component is configured to send, through the router component and the protocol component, a request message of detecting whether there is a new version or not to a version server on a network side after the DHCP server successfully allocates the private IP address to the upgrading component, and when there is the new version on the version server, download the new version from the version server and write the new version into a flash of the data terminal, which enables the data terminal to finish upgrading upon automatic restart.

2. The device according to claim 1, further comprising: an IP processing component, wherein the IP processing component is coupled with a Personal Computer (PC); and the IP processing component is configured to acquire, through the router component, an IP address of the PC from the DHCP server component, allocate the acquired IP address to the PC, and perform user service processing between the PC and the network side through the router component and the protocol component.

3. The device according to claim 2, wherein
the IP processing component is further configured to send a DHCP discover message to the DHCP server component through the router component;
the DHCP server component is further configured to process the DHCP discover message, and return a DHCP offer message to the IP processing component through the router component;
the IP processing component is further configured to process the received DHCP offer message, and return a DHCP request message to the DHCP server component through the router component;
the DHCP server component is further configured to process the DHCP request message, and return a DHCP Acknowledgement (ACK) message to the IP processing component through the router component, wherein the DHCP ACK message contains a private IP address allocated to the PC; and
the IP processing component is further configured to, when a user dials, allocate, through an Object Identifier (OID) message, to the PC the private IP address allocated by the DHCP server component.

4. The device according to claim 3, wherein when the data terminal is required to pass win8 logo authentication, the IP processing component is further configured to implement Mobile Broadband Interface Model (MBIM) related processing with the PC through an MBIM protocol.

5. The device according to claim 2, wherein
the IP processing component is further configured to receive and process a network access request message sent by the PC; send the network access request message to the network side through the router component and the protocol component; receive a response message returned by the network side through the router component and the protocol component; and process the response message and send the response message to the PC.

6. The device according to claim 2, further comprising: a web server component, which is configured to perform web service control for the PC through the router component and the IP processing component.

7. The device according to claim 6, wherein
the IP processing component is further configured to receive and process a web server access request message sent by the PC, and send the web server access request message to the web server component through the router component;
the web server component is further configured to return a response message to the IP processing component through the router component; and
the IP processing component is further configured to process the response message, and send the response message to the PC.

8. A method for upgrading a data terminal, comprising:
initiating and implementing, by a dialling component, a network dialling flow of a data terminal; negotiating and implementing, by an upgrading component, a DHCP procedure with a Dynamic Host Configuration Protocol (DHCP) server component, and allocating, by the DHCP server component, a private Internet Protocol (IP) address to the upgrading component;
after the DHCP server successfully allocates the private IP address to the upgrading component, sending, by the upgrading component, a request message of detecting whether there is a new version or not to a version server on a network side through a router component and a protocol component; and
when there is the new version on the version server, downloading, by the upgrading component, the new version from the version server, and writing, by the upgrading component, the new version into a flash of the data terminal, which enables the data terminal to finish upgrading upon automatic restart.

9. The method according to claim 8, further comprising:
acquiring, by an IP processing component, an IP address of a Personal Computer (PC) from the DHCP server component through the router component, and allocating, by the IP processing component, the acquired IP address to the PC; and
performing, by the IP processing component, user service processing between the PC and the network side through the router component and the protocol component.

10. The method according to claim 9, wherein acquiring, by the IP processing component, the IP address of the PC from the DHCP server component through the router component, and allocating, by the IP processing component, the acquired IP address to the PC comprises:
sending, by the IP processing component, a DHCP discover message to the router component, through which the DHCP discover message is further sent to the DHCP server component;
processing, by the DHCP server component, the DHCP discover message, and returning, by the DHCP server component, a DHCP offer message to the IP processing component through the router component;
processing, by the IP processing component, the received DHCP offer message, and returning, by the IP processing component, a DHCP request message to the DHCP server component through the router component;
processing, by the DHCP server component, the DHCP request message, and returning, by the DHCP server component, a DHCP Acknowledgement (ACK) message to the IP processing component through the router component, wherein the DHCP ACK message contains a private IP address allocated to the PC; and
when a user dials, allocating, by the IP processing component through an Object Identifier (OID) message, to the PC the private IP address allocated by the DHCP server component.

11. The method according to claim 10, wherein after allocating, by the IP processing component through the OID message, to the PC the private IP address allocated by the DHCP server component, the method further comprises:

when the data terminal is required to pass win8 logo authentication, implementing, by the IP processing component, Mobile Broadband Interface Model (MBIM) related processing with the PC through an MBIM protocol.

12. The method according to claim 9, wherein performing, by the IP processing component, user service processing between the PC and the network side through the router component and the protocol component comprises:
receiving and processing, by the IP processing component, a network access request message sent by the PC, and sending, by the IP processing component, the network access request message to the network side through the router component and the protocol component; and
receiving, by the IP processing component through the router component and the protocol component, a response message returned by the network side, processing, by the IP processing component, the response message, and sending, by the IP processing component, the response message to the PC.

13. The method according to claim 9, further comprising:
performing, by a web server component, web service control for the PC through the router component and the IP processing component.

14. The method according to claim 13, wherein performing, by the web server component, the web service control for the PC through the router component and the IP processing component comprises:
receiving and processing, by the IP processing component, a web server access request message sent by the PC, and sending, by the IP processing component, the web server access request message to the web server component through the router component;
returning, by the web server component, a response message to the IP processing component through the router component; and
processing, by the IP processing component, the response message, and sending, by the IP processing component, the response message to the PC.

15. The device according to claim 3, further comprising:
a web server component, which is configured to perform web service control for the PC through the router component and the IP processing component.

16. The device according to claim 4, further comprising:
a web server component, which is configured to perform web service control for the PC through the router component and the IP processing component.

17. The device according to claim 5, further comprising:
a web server component, which is configured to perform web service control for the PC through the router component and the IP processing component.

18. The method according to claim 10, further comprising:
performing, by a web server component, web service control for the PC through the router component and the IP processing component.

19. The method according to claim 11, further comprising:
performing, by a web server component, web service control for the PC through the router component and the IP processing component.

20. The method according to claim 12, further comprising:
performing, by a web server component, web service control for the PC through the router component and the IP processing component.

* * * * *